US010983926B2

(12) United States Patent
Tsirkin et al.

(10) Patent No.: US 10,983,926 B2
(45) Date of Patent: Apr. 20, 2021

(54) EFFICIENT USERSPACE DRIVER ISOLATION FOR VIRTUAL MACHINES

(71) Applicant: RED HAT, INC., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/116,535

(22) Filed: Aug. 29, 2018

(65) Prior Publication Data

US 2020/0073829 A1  Mar. 5, 2020

(51) Int. Cl.
| G06F 12/06 | (2006.01) |
| G06F 12/10 | (2016.01) |
| G06F 13/14 | (2006.01) |
| G06F 13/10 | (2006.01) |

(52) U.S. Cl.
CPC ............ G06F 13/14 (2013.01); G06F 13/102 (2013.01); G06F 2213/0024 (2013.01)

(58) Field of Classification Search
CPC .............................. G06F 12/06; G06F 12/1009
See application file for complete search history.

(56) References Cited

U.S. PATENT DOCUMENTS

| 5,708,811 | A | 1/1998 | Arendt et al. |
| 7,673,109 | B2 | 3/2010 | Wrighton et al. |
| 8,266,628 | B2 | 9/2012 | Chen et al. |
| 8,943,296 | B2 | 1/2015 | Serebrin et al. |
| 9,424,199 | B2 | 8/2016 | Kegel et al. |
| 9,454,497 | B2 | 9/2016 | Nakajima et al. |
| 9,477,509 | B2 | 10/2016 | Tsirkin et al. |
| 9,569,247 | B2 | 2/2017 | Tsirkin et al. |
| 9,727,359 | B2 | 8/2017 | Tsirkin |
| 9,842,065 | B2 | 12/2017 | Banginwar et al. |
| 9,870,324 | B2 * | 1/2018 | Mattson, Jr. .......... G06F 12/145 |
| 10,255,088 | B2 | 4/2019 | Tsirkin |
| 2009/0144510 | A1 * | 6/2009 | Wibling ................ G06F 9/5016 711/147 |
| 2013/0283004 | A1 * | 10/2013 | Devine ............... G06F 12/1009 711/206 |
| 2014/0173600 | A1 * | 6/2014 | Ramakrishnan Nair .................... G06F 9/45533 718/1 |
| 2015/0007318 | A1 | 1/2015 | Van De Van et al. |

(Continued)

OTHER PUBLICATIONS

Ahuja, Dr. S.P. 2010-14),. "VMWare ESX Memory Management" FIS Distinguished Professor of Computer Science. 33 pages.

(Continued)

*Primary Examiner* — David E Martinez
(74) *Attorney, Agent, or Firm* — Lowenstein Sandler LLP

(57) ABSTRACT

A driver associated with a host peripheral component interconnect (PCI) device may be initiated, the host PCI device to be accessed by an application executed by a guest operating system (OS) of a guest using user space memory of the guest. A host page table switching instruction may be executed using the driver to cause a switch from a first host page table structure to a second host page table structure. The host PCI device may be accessed using the driver via a PCI alias address that is mapped to a host PCI address in the second host page table structure. Application code associated with the application may be prevented from accessing a host memory address in the second host page table structure.

20 Claims, 8 Drawing Sheets

(56) References Cited

U.S. PATENT DOCUMENTS

| | | |
|---|---|---|
| 2015/0220354 A1* | 8/2015 | Nair .................. G06F 13/28 |
| | | 710/301 |
| 2016/0014209 A1 | 1/2016 | Cesena et al. |
| 2016/0216984 A1 | 7/2016 | Tsirkin et al. |
| 2016/0253110 A1 | 9/2016 | Tsirkin |
| 2016/0253193 A1 | 9/2016 | Tsirkin |
| 2017/0061509 A1 | 3/2017 | Rosenberg et al. |
| 2017/0242721 A1 | 8/2017 | Tsirkin et al. |
| 2018/0060103 A1* | 3/2018 | Tsirkin ............... G06F 9/45558 |
| 2018/0123880 A1* | 5/2018 | Wen .................... G06F 9/45558 |
| 2018/0136867 A1 | 5/2018 | Tsirkin |
| 2018/0165117 A1 | 6/2018 | Reumann et al. |
| 2018/0173555 A1 | 6/2018 | Lutas |
| 2018/0203804 A1 | 7/2018 | Kraemer et al. |
| 2020/0073826 A1 | 3/2020 | Tsirkin |

OTHER PUBLICATIONS

Liu, Y. et al. (Oct. 12-16, 2015). "Thwarting Memory Disclosure with Efficient Hypervisor-enforced Intra-domain Isolation".

Li, Wenhao, et al., "Reducing World Switches in Virtualized Environment with Flexible Cross-world Calls", Shanghai <ey Laboratory of Scalable Computing and Systems, Shanghai Jiao Tong University, Jun. 2015, 13 pages.

Sharif, Monirul, et al., Secure IN-VM Monitoring Using Hardware Virtualization, Georgia Institute of Technology, Alanta, GA, USA; Microsoft Research, Redmond, WA, USA; Institute Eurecom, Sophia Antipolis, France, Nov. ~209, 12 pages.

Milewski, Bartosz, Virtual Machines: Virtualizing Virtual Memory, Corensic, Multicore Concurrency Blog, Dec. 5, 2011, 7 pages.

\* cited by examiner

EFFICIENT USERSPACE DRIVER ISOLATION FOR VIRTUAL MACHINES

TECHNICAL FIELD

The disclosure is generally related to virtualization systems in a computing device, and more particularly, to efficient user space driver isolation for virtual machines.

BACKGROUND

Computer systems often include memory management features that provide memory protection. The memory management features may restrict particular processes from accessing particular portions of one or more devices. The devices may be physical devices, virtual devices, or a combination thereof. The restriction may be enforced using a combination of hardware features and kernel features that work together to provide or restrict an executing process from accessing memory resources. The memory resources are often separated into user space and kernel space and when a user space process attempts to access memory resources in kernel space the memory management features may generate a segmentation fault. The segmentation fault may indicate that an access violation occurred so that it can be handled accordingly. Device drivers often execute in kernel space and rely on the memory management features to protect memory associated with the device driver from being accessed by user space processes.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
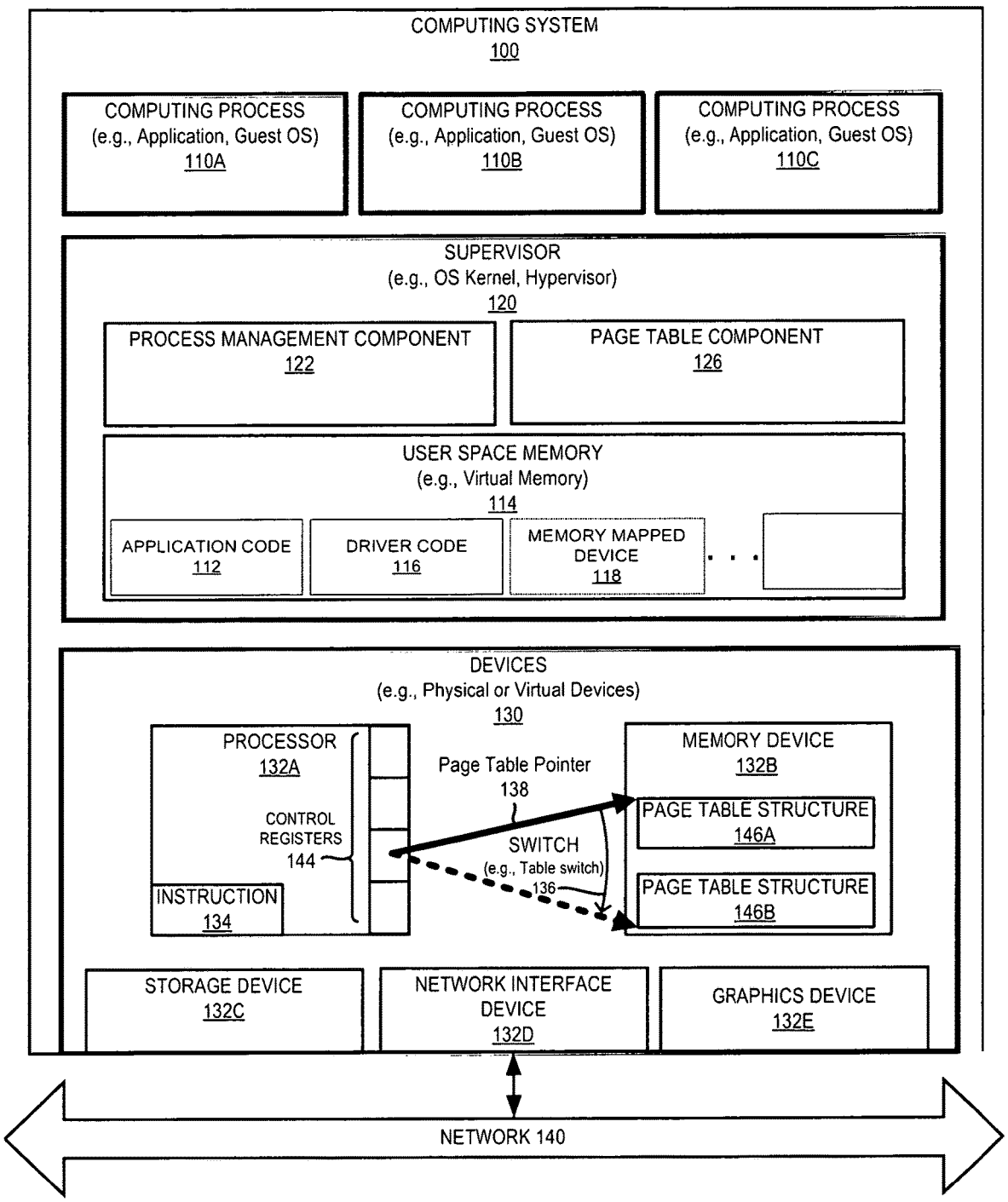
FIG. 1 depicts a high-level block diagram of an example computing system, in accordance with one or more aspects of the disclosure.

Modern computer systems have begun implementing device drivers in user space to enhance performance even though it adversely affects the memory protection features of the computer system. In one example, driver code of the device driver may be loaded into user space memory so that processes (e.g., application processes) can execute the driver code while in user mode without performing a context switch to a more privileged mode via a system call or hypercall. Therefore, the user mode process can interact with a device and avoid the overhead of context switches that occur when executing a system call or hypervisor call.

However, a drawback of such user space drivers is that application code may be able to circumvent the driver code to directly access the device. The access may be malicious or inadvertent and may be due to defective code (e.g., bug), malicious code, other code, or a combination thereof. Circumventing the driver code to access the device may result in the memory of the device being corrupted, the device becoming inoperable, other results, or a combination thereof.

Aspects of the disclosure address the above and other deficiencies by providing technology that enhances memory protection when implementing user space device drivers. The technology may involve the creation and use of two or more host page table structures to control which portions of code in user space memory have access to a device. A host page table structure refers to a data structure used by a virtual memory system to store mapping between virtual addresses and physical addresses. Each of the host page table structures may include mapping data that correlates addresses in user space memory (e.g., virtual addresses) to addresses in physical memory (e.g., physical addresses). The mapping data may include the introduction of alias addresses for guest memory and for device (e.g., peripheral component interconnect (PCI)) memory. As a result of different mappings to the alias addresses in the different host page table structures, the first host page table structure may render the application code executable while the second host page table structure may render the same application code non-executable. During execution, the user space device driver may cause a processing device to switch from the first host page table structure to the second host page table structure to enable driver code to access the device. Prior to completing its execution, the driver code may switch the host page table back to the first host page table structure to enable the application code to continue to execute.

In one example, the technology involves a processing device that supports multiple host page table structures and exposes an instruction that enables a user space process to switch between the host page table structures. The processing device may execute a supervisor process (e.g., kernel or hypervisor) that creates and manages a computing process (e.g., application or virtual machine). The computing process may execute in user mode and be associated with a portion of user space memory. The computing process may request access to a host peripheral component interconnect (PCI) device of a host system. The hypervisor may generate a first host page table structure and a second host page table structure that may be used to prevent application code of the application from accessing the host PCI device.

In the first host page table structure, a guest memory address and a guest memory alias address (e.g., virtual addresses) may be mapped to a host memory address (e.g., physical address) of a host memory. Correspondingly, at the guest, application code of the guest may be mapped, via page tables at the guest, to the guest memory address. Similarly, driver code of the guest associated with a driver of the host PCI device may be mapped to the guest memory alias address via the page tables at the guest. As the guest memory address and the guest memory alias address are both mapped to the host memory address in the first host page table structure, the application code (which is mapped to the guest memory address at the guest) and the driver code (which is mapped to the guest memory alias address at the guest) are both executable by accessing the host memory via the host memory address using the first host page table structure (i.e., when the first host page table structure is indicated as controlling in the current operating context).

The first host page table structure may also include a guest PCI address and a guest PCI alias address. In the first host page table structure, the guest PCI address is mapped to a host PCI address to access the host PCI device, while the guest PCI alias address is not mapped to the host PCI address. As such, the guest PCI alias address cannot be used to access the host PCI device when the first host page table structure is indicated as controlling in a current operating context.

Furthermore, in implementations of the disclosure, the guest PCI alias address is mapped to user space memory at the guest (thus affording the above-noted performance enhancements of executing driver code in the user space of the guest). As the guest PCI alias address is not mapped to the host PCI address in the first host page table structure, neither the application code nor the driver code, when executed by the guest OS while the first host page table structure is indicated as controlling, are able to access the host PCI device. As discussed in more detail below, a host page table switching instruction is utilized in implementations of the disclosure to allow the device driver code access to the device memory, while the application code is prevented such access.

In the second host page table structure, the guest memory address is not mapped to the host memory address, while the guest memory alias address is mapped to the host memory address. As the guest memory address in the second host page table structure is not mapped to the host memory address, the application code (which is mapped to the guest memory address at the guest) is non-executable and cannot access the host memory via the host memory address when the second host page table structure is indicated as controlling. Furthermore, as the guest memory alias address in the second host page table structure is mapped to the host memory address, the driver code (which is mapped to the guest memory alias address at the guest) is executable and can access the host memory via the host memory address.

The second host page table structure may also include the guest PCI address and the guest PCI alias address, which are both mapped to the host PCI address to access the host PCI device. As the guest PCI alias address is mapped to the host PCI address in the second host page table structure, when the driver code is executed by the guest OS using the second host page table structure, the driver code is able to execute (i.e., can access host memory) and can access the host PCI device via the PCI alias address mapped to the user space memory in the guest. However, as previously described, when the second host page table structure is indicated as controlling in the current operating context, application code is non-executable and cannot access the host memory and cannot access the device or device memory.

Thus, when the second host page table structure is indicated as controlling in the current operating context, the driver code can access the host PCI device, while the application code cannot execute and is prevented from accessing the host PCI device. Correspondingly, when the first host page table structure is indicated as controlling in the current operating context, the application is executable and can access the host memory, but the host PCI device is not accessible using the driver code (as the guest PCI alias address used to access the device memory in the guest is not mapped to the device memory in the first host page table structure).

To allow the application running on the guest OS to execute while still providing access to the host PCI device, the guest OS may execute a host page table switching instruction to switch from the first host page table structure to the second host page table structure. In embodiments, the driver code of the driver may be modified to execute the host page table switching instruction. For example, the application running on the guest OS may transmit a request to access the host PCI device to the guest OS. In response to receiving the request, the guest OS may initiate the modified driver code of the driver, which causes the guest OS to execute the host page table switching instruction. In response to execution of the host page table switching instruction, the processor of the underlying host device switches control from the first host page table structure to the second host page table structure in the current operating context.

When the second host page table structure is indicated as controlling, the driver code can access the host PCI device via the guest PCI alias address (mapped to the user space memory in the guest), which is mapped to the host PCI address in the second host page table structure. This access can occur without the risk of application code (which is non-executable in the second host page table structure) affecting the host PCI device. The driver code may be further modified to execute a subsequent host page table switching once the host PCI device has been accessed. Responsive to this subsequent switching instruction, context control is switched from the second host page table structure back to the first host page table structure so that the application process can continue normal execution.

The systems and methods described herein include technical improvements to memory management features of a computer system that implements user space device drivers. In particular, aspects of the disclosure may enhance the memory protection which may increase security, stability, and maintenance of a computing device. The security may be enhanced because the technology may enable memory isolation between different portions of a process's user space memory and enforce the use of driver code to access the device. For example, insecure application code that is loaded in user space memory may have restricted access to device memory even though the device memory is mapped into the user space memory. This may enhance device stability because the memory protection may reduce direct access of application code to a device and therefore enforce application code to use driver code to access the device (e.g., use of a certified driver by device manufacture). This may also enhance maintenance because the isolation may make it easier to separate and debug application defects and device driver defects.

Various aspects of the above referenced methods and systems are described in details herein below by way of examples, rather than by way of limitation. The examples provided below discuss the method above applied to isolate application code from device memory. In other examples, the method and system discussed herein may be applied to any code executing in user space memory and may be used to protect or isolate portions of user space memory from being accessed by executable code stored within the user space memory.

FIG. 1 depicts an illustrative architecture of elements of a computing system 100, in accordance with an embodiment of the disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a supervisor 999, computing processes 110A-C, devices 132A-E, and a network 140.

Supervisor 120 may manage the execution of one or more computing processes and provide them with access to one or more underlying computing devices (e.g., hardware resources or virtualized resources). Supervisor 120 may be the same or similar to a kernel and may be a part of an operating system, hypervisor, or a combination thereof. Supervisor 120 may interact with devices 132A-E and provide hardware virtualization, operating-system virtualization, other virtualization, or a combination thereof. Hardware virtualization may involve the creation of one or more virtual machines (also referred to as "guest operating systems" hereafter) that emulate an instance of a physical computing machine. Operating-system-level virtualization may involve the creation of one or more containers that emulate an instance of an operating system. In one example, supervisor 120 may be a part of a non-virtualized operating system that is absent hardware virtualization and operating-system-level virtualization and each of the computing processes 110A-C may be an application process managed by the non-virtualized operating system. In another example, supervisor 120 may be a hypervisor or include hypervisor functionality and each of computing processes 110A-C may execute within a separate virtual machine or container.

In the example, shown in FIG. 1, supervisor 120 may include process management component 122 and page table component 126. Process management component 122 may enable supervisor 120 to create and configure computing processes 110A-C. Page table component 126 may enable supervisor 120 to provide enhanced memory management features using a combination of multiple page table structures. Page table component 126 may enable supervisor 120 to create and configure the multiple page table structures 132a-b. Process management component 122 and page table component 126 are discussed in more detail in regards to FIG. 2. Supervisor 120 may use components 122 and 126 to provide enhanced memory management features for computing processes 110A-C.

Computing processes 110A-C may include a sequence of instructions that can be executed by one or more processing devices (e.g., processor 132A). A computing process may be managed by supervisor 120 or may be a part of supervisor 120. For example, supervisor 120 may execute as one or more computing processes that cooperate to manage resource accessed by computing processes 110A-C. Each computing process may be a thread, a process, other stream of executable instructions, or a combination thereof. A thread may any computer based "thread of execution" and may be the smallest sequence of programmed instructions managed by a kernel 120. A process may include one or more threads and may be an instance of an executable computer program.

Computing processes 110A-C may be associated with a particular level of privilege that may be the same or similar to protection levels (e.g., processor protection rings). The privilege level may indicate an access level of a computing process to computing devices (e.g., memory, processor, or other virtual or physical resources). There may be multiple different privilege levels assigned to the computing processes 110A-C. In one example, the privilege levels may correspond generally to either a supervisor privilege level (e.g., kernel mode, root mode, privileged mode) or a user mode privilege level (e.g., non-root, non-privileged). The user mode privilege level may enable a computing process to access resources assigned to the computing processes but may restrict access to resources assigned to kernel space or to another user mode process (e.g., other portion of user space). The supervisor mode privilege level may enable a processing thread to access resources associated with the kernel space or the user space. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

A computing process may be referred to as user space process when the computing process is associated with the user mode privilege level. The term user space process and user mode process may be used interchangeably herein. In one example, the privilege level associated with a computing process may change during execution and a computing process executing in user space (e.g., userland) may request and be subsequently granted enhanced privileges by supervisor 120. Modifying the privilege level often is associated with a context switch (e.g., system call or hypercall), which may be associated with a substantial performance penalty. Therefore, it is advantageous if a user space process can avoid a modification of its privilege level and can execute tasks using user space memory 114.

User space memory 114 may be a portion of virtual memory that is assigned to a particular computing process (e.g., 110A). The virtual memory may be managed by supervisor 120 and may be segregated into kernel space (not shown) and user space. The user space may be referred to as userland and may be further segregated into portions assigned to computing processes 110A-C. To simplify the illustration, the portions of the user space assigned to computing process 110A is illustrated (e.g., user space memory 114) and the portion of user space assigned to computing processes 110B and 110C are not shown. During execution of computing process 110A, the user space memory 114 may be updated to add or remove executable data and non-executable data.

The executable data may be referred to as executable code and may include binary code, machine code, object code, bytecode, other code, or a combination thereof. The executable code may be a collection of one or more instructions, operations, commands, or a combination thereof. The executable code loaded into user space memory 114 from storage objects in secondary storage (e.g., hard drive, solid state drive). The storage objects may include one or more file objects (e.g., files, directories), database objects (e.g., records), other storage objects, or a combination and may correspond to one or more executables (EXE), libraries (e.g., dynamically linked library (DLL), shared object library (SO)), other executable object, or a combination thereof. As shown in FIG. 1, the executable data in user space memory 114 may include executable code for different programs as illustrated by application code 112 and driver code 116.

Application code 112 and driver code 116 may correspond to executable data from different computer programs that may or may not interact with one another. The computer programs may be designed, developed, and distributed by different entities or by the same entity. Application code 112 may depend on functionality provided by the driver code 116 or may be independent from functionality provided by the driver code 116. Application code 112 may depend on driver code 116 if it invokes features implemented by driver code 116. In one example, the application code 112 may link directly or indirectly to the driver code 116 and make calls to the driver code 116 to perform computing tasks.

Application code 112 may be any computer program and may include application code. The term application code may be used synonymously with program code and need not provide a user interface or interact directly or indirectly with a user. Some examples of application code 112 may include one or more computer programs implementing network function virtualization (NFV). Network function virtualization may be a virtual network architecture that virtualizes networking features provided traditional network nodes. Network function virtualization may provide virtual switches, routers, firewalls, network accelerators, intrusion detection devices, load balancers, other networking device, or a combination thereof.

Driver code 116 may be any computer program that is associated with one or more of devices 132A-E (e.g., network interface device 132D). Driver code 116 may include executable code of a device driver that operates or controls a particular type of device. The driver code 116 may enable computing processes 110A-C (e.g., applications) or supervisor 120 (e.g., kernel) to access functions of a device without being aware of how the device functions. The device driver may communicate with the device through a computer bus or communication subsystem.

Driver code 116 may provide features (e.g., routines, functions, methods) that can be invoked by application code 112 or supervisor 120. In response to being invoked, driver code 116 may issue commands to the corresponding device. When the device sends data back to the device driver, the device driver may invoke routines in the original invoking program. Device drivers may be dependent on the supervisor type (e.g., operating-system type), processor type (e.g., instruction set architecture), or a combination thereof. In one example, driver code 116 may be used to implement a user space device driver.

A user space device driver is a device driver that can be executed by a computing process that is running at a user mode privilege level (e.g., a user space process). The driver code for the user space device driver may be loaded into user space memory of the same computing process that is invoking the driver code or into the user space memory of a different computing process. As used herein, the term user space device driver may be used interchangeably with user mode device driver. In one example, the user space device driver may be based on a data plane development kit (DPDK). The DPDK may be a framework that includes a set of network interface controller drivers and data plane libraries that support fast packet processing for high speed data packet networking applications. In another example, the user space device driver may be based on a storage performance development kit (SPDK). The SPDK may be a framework that includes a set of storage controller drivers and libraries that support high performance storage applications. SPDK may enable storage drivers to execute in user space to avoid system calls (e.g., syscalls), hypervisor calls (e.g., hypercalls), or a combination thereof. SPDK may enable zero-copy access from application code. SPDK may also or alternatively enable polling hardware for completions instead of relying on interrupts and avoid (e.g., reduce or eliminate) locks in the I/O path instead relying on message passing.

The user space device driver may communicate with a device by modifying memory mapped device 118. Memory mapped device 118 may be a portion of user space memory 114 that is mapped to a particular device (e.g., storage device 132C, network interface device 132D, graphics device 132E, etc.). Memory mapped device 118 may be used to implement memory mapped input/output (I/O) and may be a region of virtual memory that when modified transmits data to one of the devices as opposed to main memory. In one example, the portion of user space memory for memory mapped device 118 may correspond to memory of the particular device. Therefore, when computing process 110A stores data to memory mapped device 118 it may be stored in data storage of the device as opposed to main memory. In another example, the portion of user space memory for memory mapped device 118 may correspond to a communication channel (e.g., data bus, port, or other interface) that transmits data to a processor of the device. In either example, memory mapped device 118 may enable computing process 110A to communicate with one or more of devices 132A-E.

Devices 132A-E may be any computing device that can receive a request and perform a computing task. The computing task may involve transmitting data (e.g., output data), receiving data (e.g., input data), or a combination thereof. Devices 132A-E may include physical devices, virtual devices, or a combination thereof. As shown in FIG. 1, device 132C may be a storage device, device 132D may be a network interface device, and device 132E may be a graphics device. The storage device may include a storage controller associated with one or more mass storage devices that include solid-state storage (e.g., Solid State Drives (SSD)), hard drives, other persistent data storage, or a combination thereof. The network interface device may provide access to a network internal to computing system 100 or external to computing system 100 (e.g., network 140) and in one example may be a network interface controller (NIC). The graphics device may provide graphics processing for computing system 100. One or more of devices 132A-E may be combined into one or more physical devices (e.g., integrated devices) or may partially or completely emulated by a combination of computing resources. Computing resources may refer to the physical devices, virtual devices, of computing system 100 and may include a processor 132A and memory 132B.

Processor 132A may refer to one or more processing devices or processing units that are capable of executing instructions that encode arithmetic, logical, or I/O operations. Processor 132A may be a single core computer processor capable of executing one instruction at a time (e.g., single pipeline of instructions) or may be a multi-core computer processor that simultaneously executes multiple instructions concurrently. Processor 132A may include features of a central processing unit (CPU), graphical processing unit (GPU), a microcontroller, other computer processor, or a combination thereof.

Processor 132A may implement an instruction set architecture (ISA) that functions as an interface between processor 132A and the computing processes being executed by processor 132A (e.g., computing processes 110A-C). The instruction set architecture may be the same or similar to x86 (e.g., Intel®, AMD®), PowerPC®, Advanced RISC Machine (ARM®), Scalable Processor Architecture (SPARC®), other computer architecture, or a combination thereof. The instruction set architecture may include an instruction 134.

Instruction 134 may cause the processor to switch the current page table structure. Instruction 134 may be referred to herein as host page table switching instruction, page table switch instruction, switching instruction, and so on. The instruction 134 may be a hardware instruction or a processor instruction and may cause switch 136 (e.g., page table switch, table switch). Instruction 134 may be exposed to code executing at a user mode privilege level (e.g., non-root), a kernel privilege level (e.g., root), other privilege level, or a combination. As a result, instruction 134 may be invoked by computing processes 110A-C, supervisor 120, or a combination thereof. In one example, instruction 134 may switch between multiple page table structures by updating one or more control registers 144. Switching between the multiple page table structures causes one of the page table structures to be indicated as controlling in a current operating connect of the processor 132A.

Control registers 144 may be registers that control the behavior of processor 132*a*. Control registers 144 may be in internal register that is on the processor (e.g., processor registers) or may be an external register that is external to the processor (e.g., hardware registers). In either example, control registers may be set or updated to control processor behavior related to interrupts, addressing modes, paging control, other processor functions, or a combination thereof. One or more of the control registers 144 may include a page table pointer 138. In one example, processor 132*a* may include a single control register (e.g., CR3) that includes a page table pointer 138. In another example, processor 132*a* may include multiple control registers (e.g., CR3 and CR7) that each include a page table pointer 138. Page table pointer 138 may include identification data (e.g., physical memory address) of page table data structure 146A or 146B.

Page table structures 146A and 146B may be data structures that store to mapping data and maps locations within a virtual address space (e.g., virtual memory) to locations in a physical address space (e.g., physical memory). A page table structure may include one or more page tables. Processor 132A and supervisor 120 may use the page table structure to resolve a virtual memory address to a physical address. In some instances, computing system 100 may support hardware virtualization features that support a guest operating system (OS) and a hypervisor. The guest OS and the hypervisor may each implement memory management features that virtualize the memory resources. As a result, the guest virtual memory and hypervisor virtual memory may overlap and each may have a corresponding page table structure that would need to be used to resolve a guest virtual memory address to a host physical address.

For example, a guest operating system may use a first layer page table to map a guest virtual memory address to a guest physical memory address. The guest physical memory address may or may not be identical the hypervisor virtual memory address and the hypervisor may use a second layer page table to map the hypervisor virtual memory address to the host physical address. To avoid the overhead of a multiple separate layers of address translation, the page table structure may be a nested page table (NPT). The nested page table may enable second level address translation by including mapping data that enables a processor to resolve a guest virtual memory address directly to host physical memory address. Page table structures 146A-B may be nested page tables and may be the same or similar to Extended Page Tables (EPT) of Intel®, Rapid Virtualization Indexing (RVI) by AMD®, other hardware-assisted virtualization structure, or a combination thereof and may be stored in memory device 132B.

Memory device 132B may include any persistent or non-persistent data storage that is capable of storing digital data. Memory device 132B may function as main memory for computer system 100 and may include one or more physical memory devices. The physical memory device may be the same or similar to volatile memory devices (e.g., RAM), non-volatile memory devices (e.g., NVRAM), other types of memory devices, or a combination thereof.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
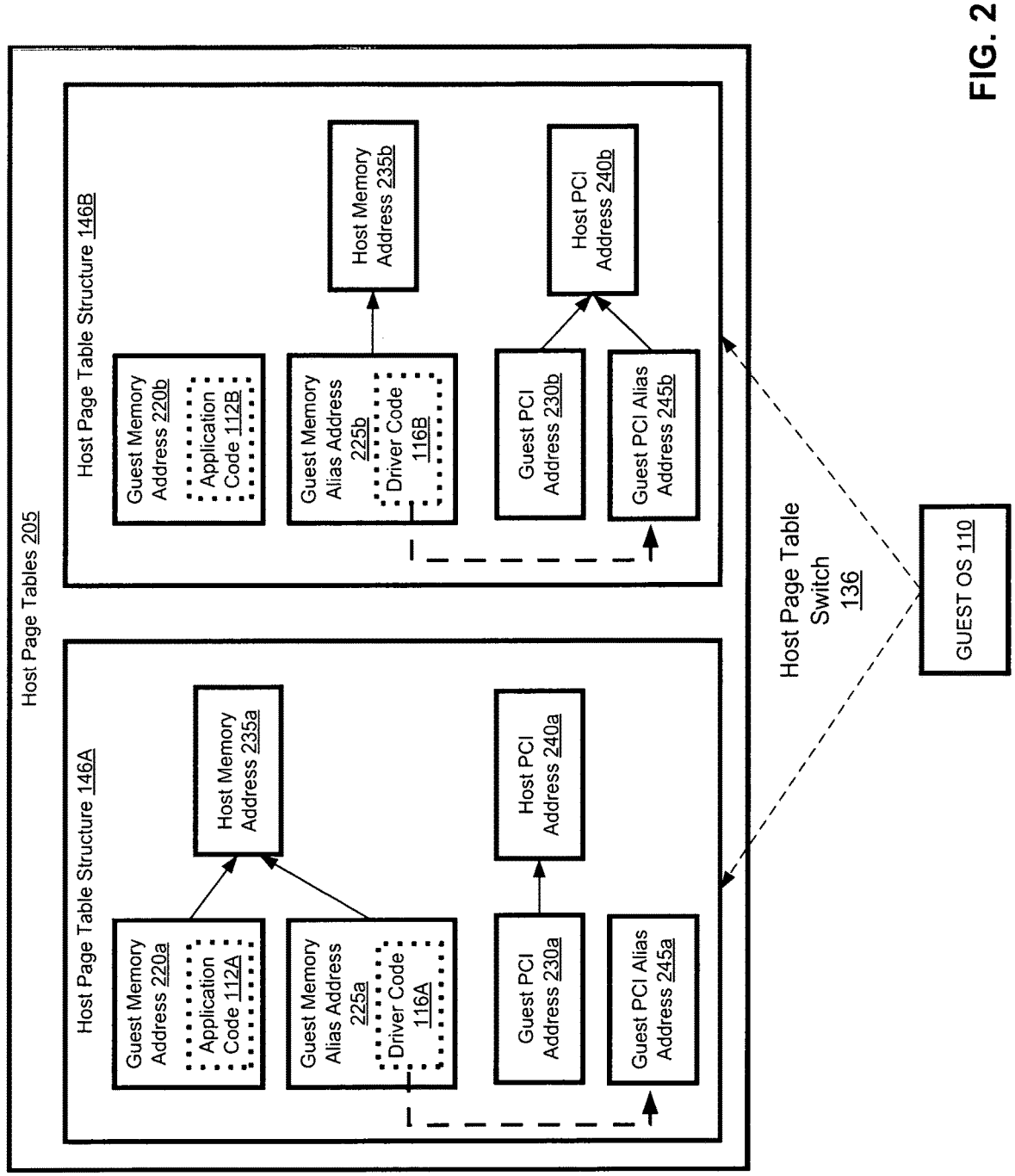
FIG. 2 depicts a block diagram illustrating an exemplary hypervisor that includes a first host page table structure and a second host page table structure, in accordance with one or more aspects of the disclosure.

FIG. 2 depicts a block diagram illustrating an exemplary hypervisor 200 that includes a first host page table structure and a second host page table structure, in accordance with one or more aspects of the disclosure. Hypervisor 200 may be the same or similar to hypervisor 120 of FIG. 1 and may include a process management component 122 and a page table component 126. The components and modules discussed herein may be performed by any portion of hypervisor 200 or by a guest operating system, virtual machine, host operating system, other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Referring now to FIG. 2, host page tables 205 may include a first host page table structure 146A and a second host page table structure 146B. The first host page table structure 146A and/or the second host page table structure 146B may be a nested page table structure that includes one-to-one mapping between a guest virtual memory address and a host physical memory address. The first host page table structure 146A and the second host page table structure 146B may include guest memory addresses 220*a*, 220*b*, guest memory alias addresses 225*a*, 225*b*, guest PCI addresses 230*a*, 230*b* and guest PCI alias addresses 245*a*, 245*b*, respectively, that correspond to virtual addresses mapped by the guest OS. The first host page table structure 146A and the second host page table structure 146B may further include host memory addresses 235*a*, 235*b* and host PCI addresses 240*a*, 240*b*, respectively. The host memory addresses 235*a*, 235*b* may correspond to physical addresses of a host memory of a host system, such as computing system 100 of FIG. 1. The host PCI addresses 240*a*, 240*b* may correspond to physical addresses of the memory of a host PCI device. Although the first host page table structure 146A and the second host page table structure 146B represent two different host page table structures, the sets of addresses in the first host page table structure 146A and the second host page table structure 146B may be the same sets of addresses. For clarity, corresponding addresses, such as guest memory address 220*a* in the first host page table structure 146A and guest memory address 220*b* of the second host page table structure 146B, are referred to as "a" for the first host page table structure 146A and "b" for the second host page table structure 146B. However, in embodiments, the corresponding addresses in the first host page table structure 146A and the second host page table structure 146B may be the same addresses. For example, guest memory address 220*a* in the first host page table structure 146A may be the same virtual address as guest memory address 220*b* in the second host page table structure 146B.

Application code 112A, 112B of a guest may be associated with an application executed by a guest OS 110 using user space memory of the guest. Application code 112A, 112B may refer to application code 112 of FIG. 1. The guest OS 110 may map application code 112A, 112B to guest memory addresses 220*a*, 220*b*, respectively. For example, guest OS 110 may utilize guest-level layer of page tables (not shown) to map the application code 112A, 112B to guest memory address 220*a*, 220*b*. In the first host page table structure 146A, the guest memory address 220*a* is mapped to the host memory address 235*a*. Correspondingly, the application code 112A that is mapped to the guest memory address 220*a* (at the guest level) may access the host memory using the host memory address 235*a* as the guest memory address 220*a* is mapped to the host memory address 235*a* in the first host page table structure 146A.

In the second host page table structure 146B, the guest memory address 220*b* is not mapped to the host memory address 235*b*. As such, the application code 112B that is mapped to the guest memory address 220*b* (at the guest level) may not access the host memory using the host memory address 235*b* as the guest memory address 220*b* is not mapped to the host memory address 235*b* in the second host page table structure 146B.

Driver code 116A, 116B may be associated with a driver of a host PCI device. The guest OS 110 may map driver code 116A, 116B to guest memory alias addresses 225*a*, 225*b*, respectively. In both the first host page table structure 146A and the second host page table structure 146B, the guest memory alias addresses 225*a*, 225*b* may be mapped to the host memory addresses 235*a*, 235*b*, respectively. Accordingly, the driver code 116A, 116B that is mapped to the guest memory alias addresses 225*a*, 225*b* may access the host memory using the host memory addresses 235*a*, 235*b* as the guest memory alias addresses 225*a*, 225*b* are mapped to the host memory addresses 235*a*, 235*b* in both the first host page table structure 146A and the second host page table structure 146B.

The guest PCI alias address 245*a*, 245*b* may be mapped to user space memory at the guest level. In the first host page table structure 146A, the guest PCI alias address 245*a* is not mapped to the host PCI address 240*a*. When driver code 116A of a driver is executed while the first host page table structure 146A is indicated as controlling, the driver is unable to access the host PCI device via the host PCI address 240*a*. In the second host page table structure 146B, the guest PCI alias address 245*b* is mapped to the host PCI address 240*b*. When driver code 116B of a driver is executed while the second host page table structure 146B is indicated as controlling, the driver is able to access the host PCI device via the host PCI address 240*b*.

In embodiments, driver code 116A of the driver may be modified to execute a host page table switching instruction 136. Upon executing the host page table switching instruction 136, the processor of the underlying host device switches control from the first host page table structure 146A to the second host page table structure 146B in the current operating context. In one implementation, the host page table switching instruction 136 causes a page table pointer of control register 144 to be updated to point to a different host page table structure 146A, 146B. For example, using an Intel® processor architecture, the driver code 116A may be modified to execute a VMFUNC(0) instruction that causes a context switch from the first host page table structure 146A to the second host page table structure 146B.

Once the context is switched from the first host page table structure 146A to the second host page table structure 146B, driver code 116B may access the host PCI device via the host PCI address 240*b*. In some embodiments, subsequent to accessing the host PCI device, another host page table switching instruction may be executed. Responsive to this subsequent host page table switching instruction, context control is switched from the second host page table structure 146B back to the first host page table structure 146A so that the application process associated with application code 112A can continue normal execution.

In an embodiment, driver code 116A may be a first portion of driver code associated with a driver and driver code 116B may be a second portion of the driver code associated with the driver. For example, driver code 116A may include the modified driver code to execute the host page table switching instruction 136. Once the operating context is switched from the first host page table structure 146A to the second host page table structure 146B, driver code 116B may include code to access the host PCI device without the modified driver code to execute the host page table switching instruction 136.

Figure 3:
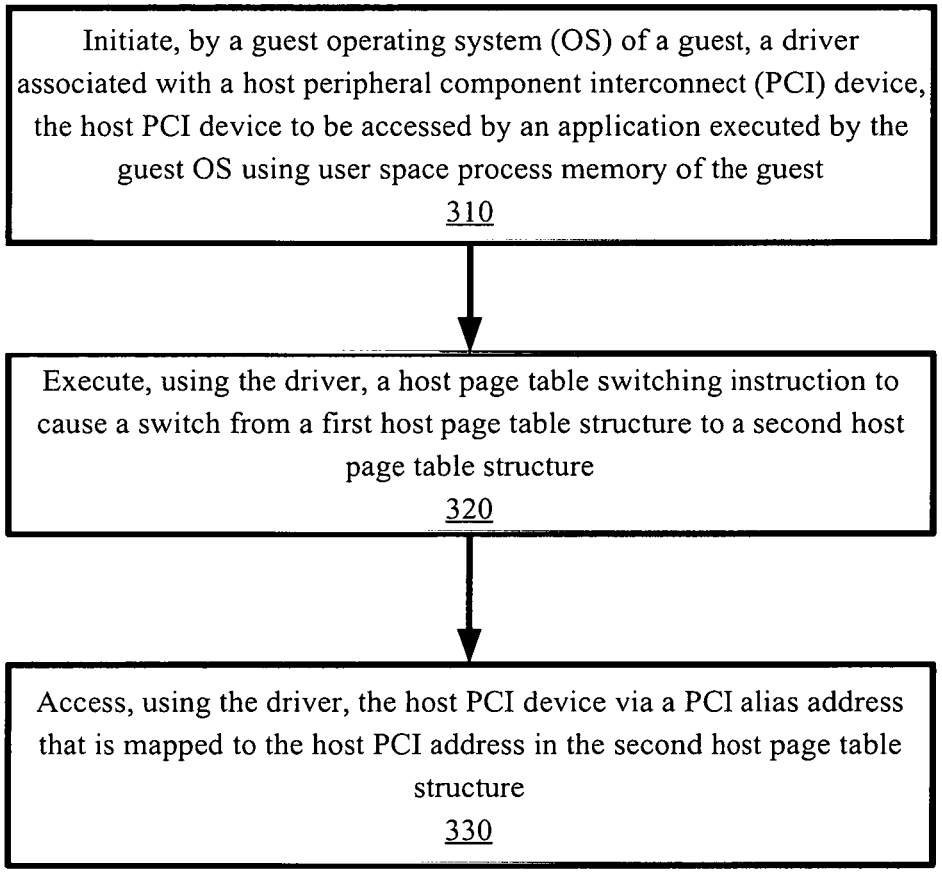
FIG. 3 depicts a flow diagram of an illustrative example of a method to execute a host page table switching instruction to cause a switch from a first host page table structure to a second host page table structure, in accordance with one or more aspects of the disclosure.

FIG. 3 depicts a flow diagram of an illustrative example of a method 300 to execute a host page table switching instruction to cause a switch from a first host page table structure to a second host page table structure, in accordance with one or more aspects of the disclosure. Method 300 and each of its individual functions, routines, subroutines, or operations may be performed by one or more processors of a computer device executing the method. In certain implementations, method 300 may be performed by a single processing thread of a hypervisor. Alternatively, method 300 may be performed by two or more processing threads executing on the computer device and each thread may execute one or more individual functions, routines, subroutines, or operations of the method. In an illustrative example, the processing threads implementing methods 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by guest OS 110 of FIGS. 1 and 2 and may begin at block 310.

At block 310, the processing device executing a guest OS of a guest may initiate a driver associated with a host PCI device. The host PCI device may be accessed by an application executed by the guest OS using user space process memory of the guest. In embodiments, the guest OS may initiate the driver in response to receiving a request from the application to access the host PCI device. As previously described at FIG. 2, driver code associated with the driver is mapped to a guest memory alias address that is mapped to a host memory address in a first host page table structure and the driver code may access the host memory via the host memory address while the first host page table structure is indicated as controlling. Application code associated with the application is mapped to a guest memory address that is mapped to the host memory address in the first host page table structure and the application code may access the host memory via the host memory address while the first host page table structure is indicated as controlling. In the first host page table structure, the guest PCI alias address may be mapped to the user space process memory of the guest. The guest PCI alias address may not be mapped to the host PCI address to access the host PCI device while the first host page table structure is indicated as controlling. As such, the guest PCI alias address cannot be used to access the host PCI device when the first host page table structure is indicated as controlling in a current operating context.

In embodiments, the driver code associated with the driver may be modified to execute a host page table switching instruction. For example, the driver code may be modified so that the first instruction of the driver code executes the host page table switching instruction to switch the current operating context from the first host page table structure to the second host page table structure.

At block 320, the processing device executes a host page table switching instruction to cause a switch from the first host page table structure to a second host page table structure using the driver. As previously described at FIG. 2, in the second host page table structure the guest PCI alias address is mapped to the host PCI address. This allows driver code associated with the driver that is mapped to the guest PCI alias address to access the host PCI device via the host PCI address while the first host page table structure is indicated as controlling. The guest memory alias address is mapped to the host memory address in the second host page table structure so that the driver code, which is mapped to the guest memory alias address, can access the host memory when the second host page table structure is indicated as controlling in the current operating context. The guest memory address is not mapped to the host memory address in the second host page table structure so that the application code, which is mapped to the guest memory address, is non-executable and cannot access the host memory when the second host page table structure is indicated as controlling.

At block 330, the processing device accesses the host PCI device via the PCI alias address that is mapped to the host PCI address in the second host page table structure using the driver. As the application code is non-executable because the guest memory address is isolated from the host memory address in the second host page table structure, the application is prevented from accessing the host PCI device while the second host page table structure is indicated as controlling. In embodiments, upon accessing the host PCI device, a second host page table switching instruction may be executed. Responsive to this second switching instruction, context control is switches from the second host page table structure back to the first host page table structure so that the application process can continue normal execution.

Figure 4:
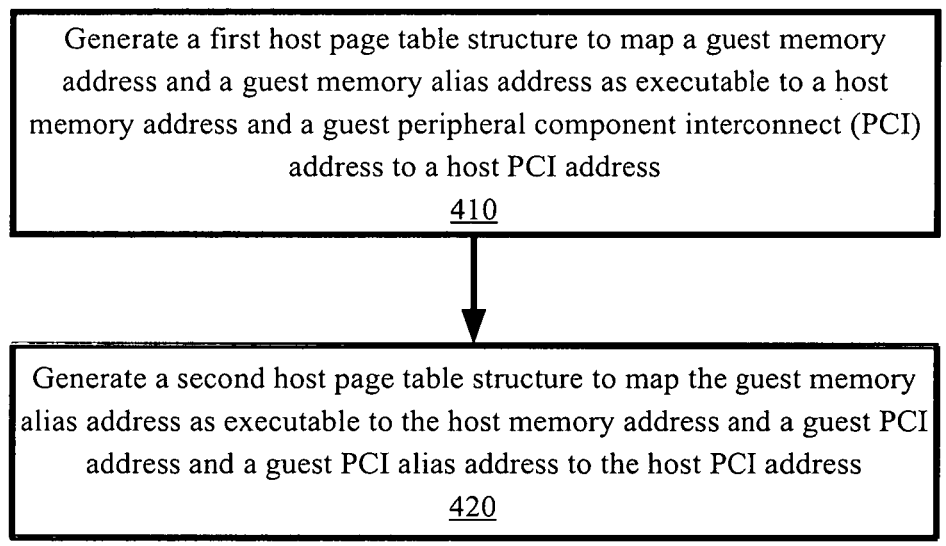
FIG. 4 depicts a flow diagram of an illustrative example of a method to generate a first host page table structure and a second host page table structure, in accordance with one or more aspects of the disclosure.

FIG. 4 depicts a flow diagram of an illustrative example of a method 400 to generate a first host page table structure and a second host page table structure, in accordance with one or more aspects of the disclosure. Method 400 and each of its individual functions, routines, subroutines, or operations may be performed by one or more processors of a computer device executing the method. In certain implementations, method 400 may be performed by a single processing thread of a hypervisor. Alternatively, method 400 may be performed by two or more processing threads executing on the computer device and each thread may execute one or more individual functions, routines, subroutines, or operations of the method. In an illustrative example, the processing threads implementing methods 400 may be synchronized (e.g., using critical sections, semaphores, and/or other thread synchronization mechanisms). Alternatively, the processes implementing method 400 may be executed asynchronously with respect to each other. In one implementation, method 400 may be performed by hypervisor 120 of FIG. 1 and may begin at block 410.

At block 410, the processing device executing a hypervisor may generate a first host page table structure. As previously described at FIG. 2, the first host page table structure maps a guest memory address and a guest memory alias address as executable to a host memory address and a guest PCI address to a host PCI address. In the first host page table structure, a guest PCI alias address. Application code associated with an application executed by a guest OS of a guest is mapped to the guest memory address, driver code associated with the host PCI device is mapped to the guest alias address and the guest PCI alias address is mapped to the user space process memory of the guest.

At block 420, the processing device may generate a second host page table structure. The second host page table structure maps the guest memory alias address as executable to the host memory address and a guest PCI address and a guest PCI alias address to the host PCI address. In the second host page table structure, the guest memory address is mapped as non-executable to the host memory address. Context control may be switched between the first host page table structure and the second host page table structure in response to execution of a host page table switching instruction by the driver code. For example, context control may be switched between the first host page table structure and the second host page table structure in response to a guest OS initiating a driver having driver code that is modified to execute a host page table switching instruction. In embodiments, the hypervisor may modify the driver code associated with the driver to execute the host page table switching instruction. In response to the context control switching from the first host page table structure to the second host page table structure, the application code may be non-executable (e.g., cannot access the host memory) while the second host page table structure is indicated as controlling, preventing the application code from accessing the host PCI device.

Figure 5:
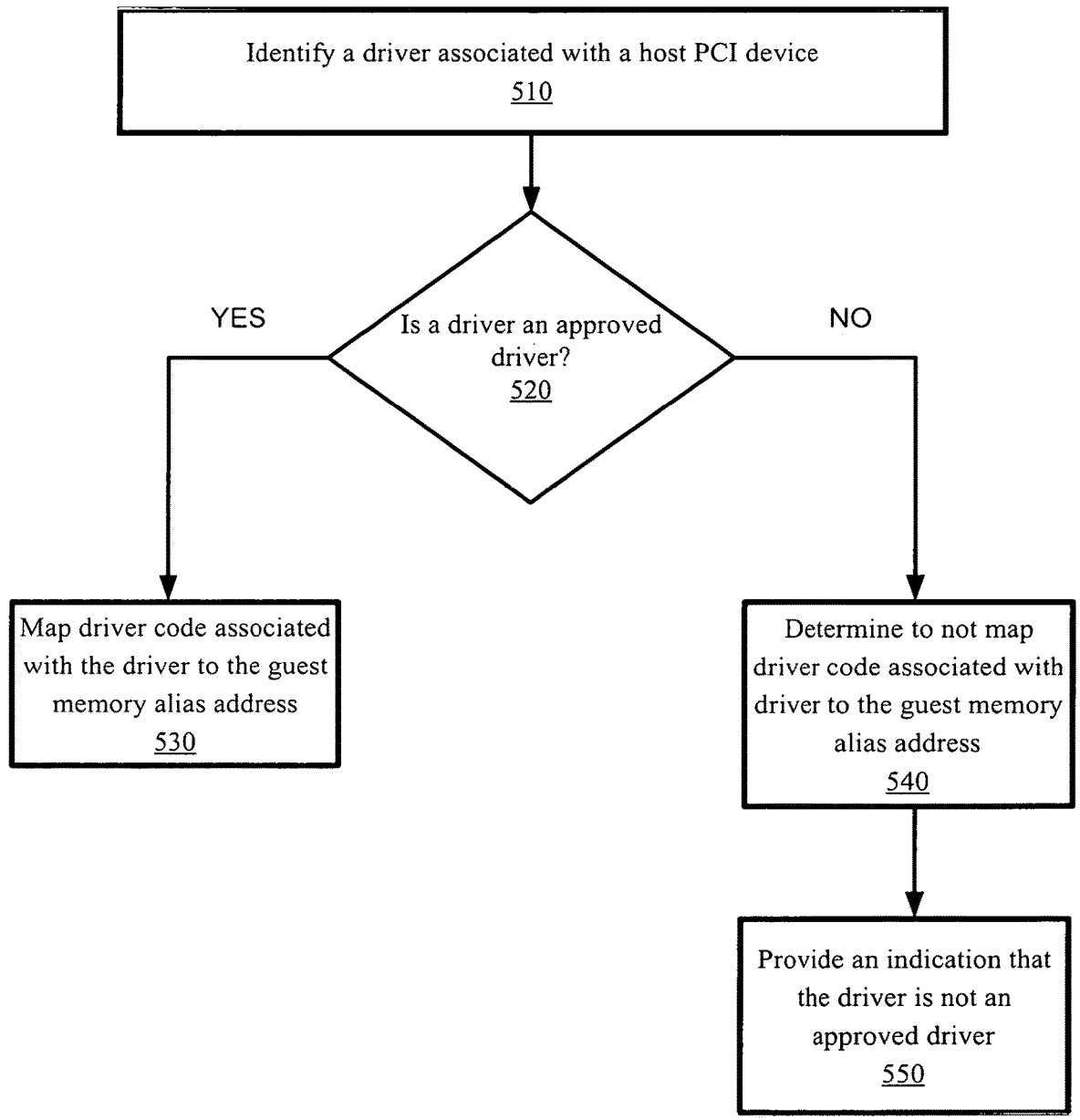
FIG. 5 depicts a flow diagram of an illustrative example of a method to determine whether a driver associated with a host PCI device is an approved driver, in accordance with one or more aspects of the disclosure.

FIG. 5 depicts a flow diagram of an illustrative example of a method 500 to determine whether a driver associated with a host PCI device is an approved driver, in accordance with one or more aspects of the disclosure. Method 500 and each of its individual functions, routines, subroutines, or operations may be performed by one or more processors of a computer device executing the method. In certain implementations, method 500 may be performed by a single processing thread of a hypervisor. Alternatively, method 500 may be performed by two or more processing threads executing on the computer device and each thread may execute one or more individual functions, routines, subroutines, or operations of the method. In an illustrative example, the processing threads implementing methods 500 may be synchronized (e.g., using critical sections, semaphores, and/or other thread synchronization mechanisms). Alternatively, the processes implementing method 300 may be executed asynchronously with respect to each other. In one implementation, method 500 may be performed by guest OS 110 of FIGS. 1 and 2 and may begin at block 510.

At block 510, the processing device executing a guest OS of a guest may identify a driver associated with a host PCI device. For example, the guest OS may identify the driver associated with the host PCI device in the user space memory of the guest.

At block 520, the processing device may determine if the driver identified at block 510 is an approved driver to prevent the use of a faulty and/or unauthorized driver that may affect a host PCI device. In embodiments, the processing device may determine whether the driver is from an approved vendor. If the driver is from an approved vendor, then the driver is an approved driver. For example, if the driver is from Vendor A and Vendor A is an approved vendor, then the driver is an approved driver. In some embodiments, the processing device may determine whether driver includes a digital signature verifying the integrity of the driver and/or the identity of the vendor. If the driver includes a digital signature verifying the integrity of the driver and/or the identity of the vendor, then the driver is an approved driver.

If the driver is an approved driver, at block 530 the processing device may map driver code associated with the driver to the guest memory alias addresses of the first host page table structure and second host page table structure. If the driver is not an approved driver, at block 540 the processing device may determine to not map the driver code associated with the driver to the guest memory alias address. At block 550, upon determining to not map the driver code associated with the driver to the guest memory alias address, the processing device may provide an indication to the guest that the driver is not an approved driver. For example, the processing device may provide a notification, such as an error message, to the guest indicating that the driver is not an approved driver.

Figure 6:
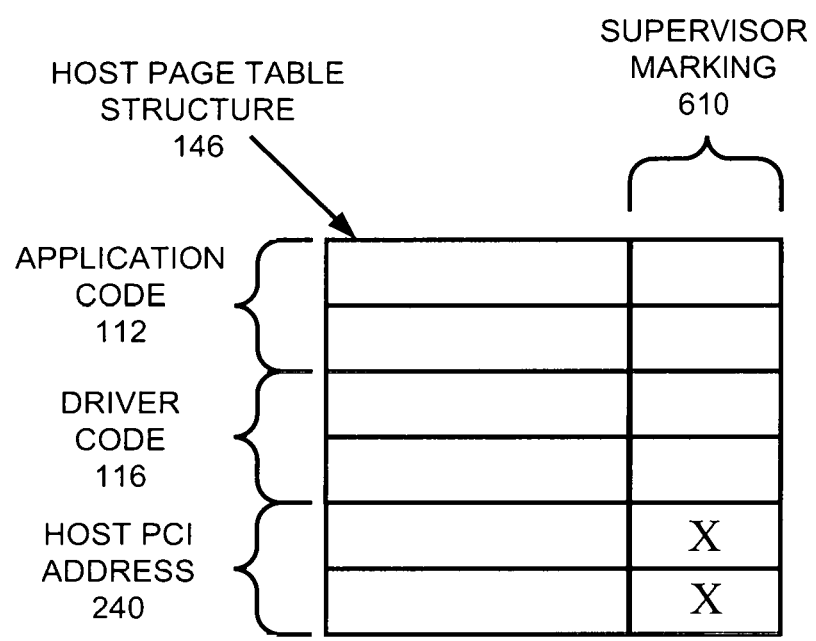
FIG. 6 is an illustration of an example host page table structure including supervisor requirement markings, in accordance with embodiments of the disclosure.

FIG. 6 is an illustration 600 of an example host page table structure including supervisor requirement markings, in accordance with embodiments of the disclosure. Some processing devices may be configured to support the marking of page table entries of a host page table structure. When a particular entry of a host page table structure is marked, access to the page table entry is limited to a guest supervisor or guest kernel. Accordingly, access to particular page table entries of a host page table structure by computing processes using user space memory of a guest, such as an application, can be prevented without the use of multiple host page tables structures and switching of context control by marking the particular page table entries, limiting access to the guest supervisor or guest kernel.

Referring to FIG. 6, host page table structure 146 includes page table entries for application code 112, driver code 116 and host PCI address 240. The host page table structure 146 may further include supervisor marking 610. Page table entries having a supervisor marking 610 may only be accessible by a guest supervisor or guest kernel. In host page table structure 146, both the application code 112 and the driver code 116 do not include a supervisor marking 610. Accordingly, the page table entries in the host page table structure 146 for the application code 112 and the driver code 116 may be accessed by a computing process using the user space memory of the guest. However, in host page table structure 146 the page table entries for host PCI address 240 include the supervisor marking 610. Accordingly, only a guest supervisor or guest kernel can access the page table entries of host page table structure 146 for the host PCI address 240. As the page table entries for the host PCI address 240 include the supervisor marking 610, computing processes using the user space memory of the guest, such as applications, are prevented from accessing the page table entries for the host PCI address 240. Preventing the computing processes from accessing the page table entries for the host PCI address 240 also prevents the computing process from accessing the host PCI device.

Figure 7:
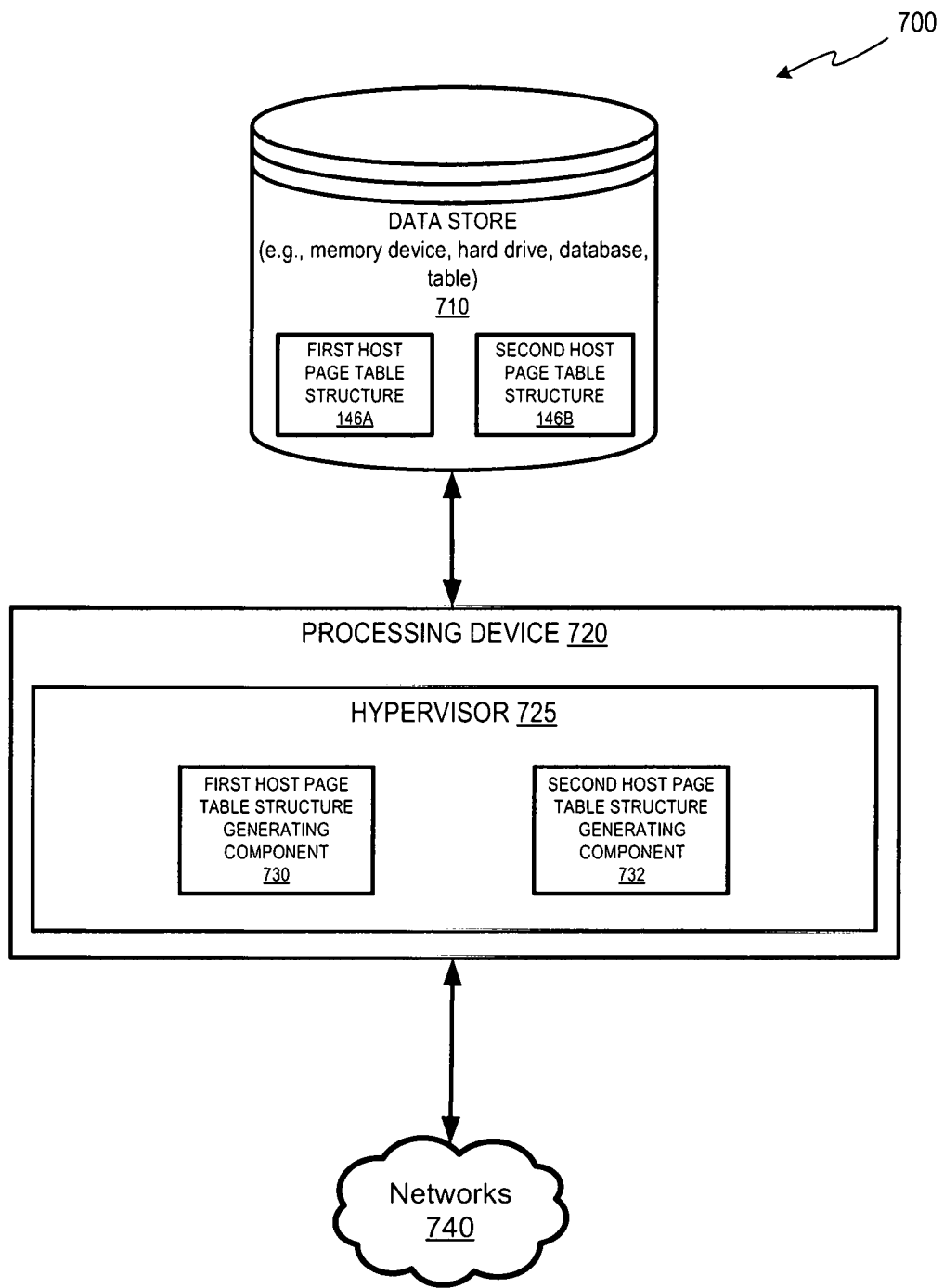
FIG. 7 illustrates an example apparatus in which implementations of the disclosure may operate in accordance with one or more aspects of the disclosure.

FIG. 7 illustrates an example apparatus 700 in which implementations of the disclosure may operate. The apparatus 700 may be the same or similar to one of the computing system, a network, or other computing devices. The data store 710 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 710 may store information (e.g., host page table structures).

The apparatus 700 may include a processing device 720. The processing device 720 may execute a hypervisor 725. The hypervisor 725 may include a first host page table structure generating component 730 and a second host page table structure generating component 732.

The first host page table structure generating component 730 may generate a first host page table structure 146A. The first host page table structure 146A may map a guest memory address and a guest memory alias address to a host memory address and a guest PCI address to a host PCI address. The second host page table structure generating component 732 may generate a second host page table structure 146B. The second host page table structure 146B may map the guest PCI alias address to the host PCI address and the guest memory alias address is mapped to the host memory address in the second host page table structure. The first host page table structure 146A and the second host page table structure 146B may be stored at data store 710.

Figure 8:
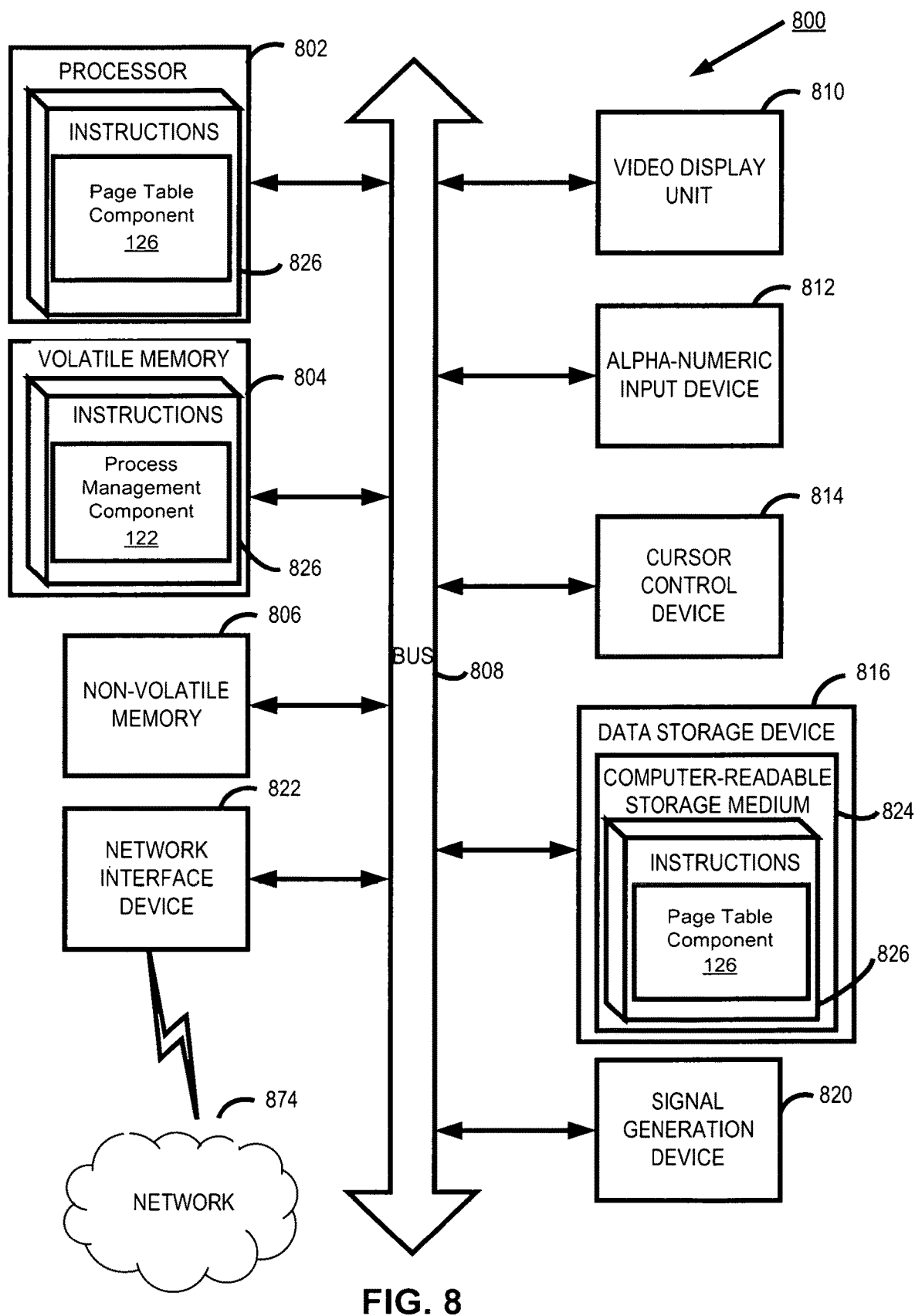
FIG. 8 depicts a block diagram of an illustrative computing device operating in accordance with the examples of the disclosure.

FIG. 8 depicts a block diagram of a computer system operating in accordance with one or more aspects of the disclosure. In various illustrative examples, computer system 800 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 300, 400 or 500 and for process management component 122 and page table component 126 of FIGS. 1 and 2.

Instructions 826 may also reside, completely or partially, within volatile memory 804 and/or within processing device 802 during execution thereof by computer system 800, hence, volatile memory 804, and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A non-transitory computer readable storage medium that comprises instructions that, when executed by a processing device, cause the processing device to:

initiate, by a guest operating system (OS) of a guest, a driver associated with a host peripheral component interconnect (PCI) device, the host PCI device accessed by an application executed by the guest OS using user space process memory of the guest, wherein:

driver code associated with the driver is mapped to a guest memory alias address and the guest memory alias address is mapped to a host memory address in a first host page table structure, application code associated with the application is mapped to a guest memory address and the guest memory address is mapped to the host memory address in the first host page table structure, a guest PCI alias address is mapped to the user space process memory of the guest, and wherein the guest PCI alias address is not mapped to a host PCI address to access the host PCI device in the first host page table structure;

execute, using the driver, a host page table switching instruction to cause a switch from the first host page table structure to a second host page table structure, wherein the guest PCI alias address is mapped to the host PCI address in the second host page table structure, the guest memory alias address is mapped to the host memory address in the second host page table structure, and the guest memory address is not mapped to the host memory address in the second host page table structure; and access, using the driver, the host PCI device via the PCI alias address that is mapped to the host PCI address in the second host page table structure, wherein the application code is isolated from the host memory address in the second host page table structure.

2. The non-transitory computer readable storage medium of claim 1, wherein the processing device is further to:
upon accessing the host PCI device via the PCI alias address that is mapped to the host PCI address in the second host page table structure, execute a second host page table switching instruction to cause the guest OS to switch from the second host page table structure to the first host page table structure.

3. The non-transitory computer readable storage medium of claim 1, wherein a first portion of the driver associated with the host PCI device is mapped to the guest memory alias address of the first host page table structure, the first portion of the driver causing the execution of the host page table switching instruction and wherein a second portion of the driver associated with the host PCI device is mapped to the guest memory alias address of the second host page table structure, the second portion of the driver comprising data to access the host PCI device.

4. The non-transitory computer readable storage medium of claim 1, wherein the first host page table structure and the second host page table structure comprise a nested page table structure comprising a one-to-one mapping between a guest virtual memory address and a host physical memory address.

5. The non-transitory computer readable storage medium of claim 1, wherein the driver code associated with the driver is modified to cause the guest OS to execute the host page table switching instruction.

6. The non-transitory computer readable storage medium of claim 1, wherein the processing device is further to:
determine whether the driver is an approved driver; and
in response to determining that the driver is an approved driver, map the driver to the guest PCI alias address of the first host page table structure and the second host page table structure, wherein initiating the driver associated with the host PCI device is in response to mapping the driver to the guest PCI alias address.

7. The non-transitory computer readable storage medium of claim 1, wherein a guest PCI address is not mapped to the user space process memory in the first host page table structure.

8. A system comprising:
a memory; and
a processing device, coupled to the memory, to:
initiate, by a guest operating system (OS) of a guest, a driver associated with a host peripheral component interconnect (PCI) device, the host PCI device accessed by an application executed by the guest OS using user space process memory of the guest, wherein:
driver code associated with the driver is mapped to a guest memory alias address and the guest memory alias address is mapped to a host memory address in a first host page table structure,
application code associated with the application is mapped to a guest memory address and the guest memory address is mapped to the host memory address in the first host page table structure,
a guest PCI alias address is mapped to the user space process memory of the guest, and
wherein the guest PCI alias address is not mapped to a host PCI address to access the host PCI device in the first host page table structure;
execute, using the driver, a host page table switching instruction to cause a switch from the first host page table structure to a second host page table structure, wherein the guest PCI alias address is mapped to the host PCI address in the second host page table structure, the guest memory alias address is mapped to the host memory address in the second host page table structure, and the guest memory address is not mapped to the host memory address in the second host page table structure; and
access, using the driver, the host PCI device via the PCI alias address that is mapped to the host PCI address in the second host page table structure, wherein the application code is isolated from the host memory address in the second host page table structure.

9. The system of claim 8, wherein the processing device is further to:
upon accessing the host PCI device via the PCI alias address that is mapped to the host PCI address in the second host page table structure, execute a second host page table switching instruction to cause the guest OS to switch from the second host page table structure to the first host page table structure.

10. The system of claim 8, wherein a first portion of the driver associated with the host PCI device is mapped to the guest memory alias address of the first host page table structure, the first portion of the driver causing the execution of the host page table switching instruction and wherein a second portion of the driver associated with the host PCI device is mapped to the guest memory alias address of the second host page table structure, the second portion of the driver comprising data to access the host PCI device.

11. The system of claim 8, wherein the first host page table structure and the second host page table structure comprise a nested page table structure comprising a one-to-one mapping between a guest virtual memory address and a host physical memory address.

12. The system of claim 8, wherein the driver code associated with the driver is modified to cause the guest OS to execute the host page table switching instruction.

13. The system of claim 8, wherein the processing device is further to:
determine whether the driver is an approved driver; and
in response to determining that the driver is an approved driver, map the driver to the guest PCI alias address of the first host page table structure and the second host page table structure, wherein initiating the driver associated with the host PCI device is in response to mapping the driver to the guest PCI alias address.

14. The system of claim 8, wherein a guest PCI address is not mapped to the user space process memory in the first host page table structure.

15. A method comprising:
  initiating, by a guest operating system (OS) of a guest, a driver associated with a host peripheral component interconnect (PCI) device, the host PCI device accessed by an application executed by the guest OS using user space process memory of the guest, wherein:
    driver code associated with the driver is mapped to a guest memory alias address and the guest memory alias address is mapped to a host memory address in a first host page table structure,
    application code associated with the application is mapped to a guest memory address and the guest memory address is mapped to the host memory address in the first host page table structure,
    a guest PCI alias address is mapped to the user space process memory of the guest, and
    wherein the guest PCI alias address is not mapped to a host PCI address to access the host PCI device in the first host page table structure;
  executing, using the driver, a host page table switching instruction to cause a switch from the first host page table structure to a second host page table structure, wherein the guest PCI alias address is mapped to the host PCI address in the second host page table structure, the guest memory alias address is mapped to the host memory address in the second host page table structure, and the guest memory address is not mapped to the host memory address in the second host page table structure; and
  accessing, using the driver, the host PCI device via the PCI alias address that is mapped to the host PCI address in the second host page table structure, wherein the application code is isolated from the host memory address in the second host page table structure.

16. The method of claim 15, further comprising:
  upon accessing the host PCI device via the PCI alias address that is mapped to the host PCI address in the second host page table structure, executing a second host page table switching instruction to cause the guest OS to switch from the second host page table structure to the first host page table structure.

17. The method of claim 15, wherein a first portion of the driver associated with the host PCI device is mapped to the guest memory alias address of the first host page table structure, the first portion of the driver causing the execution of the host page table switching instruction and wherein a second portion of the driver associated with the host PCI device is mapped to the guest memory alias address of the second host page table structure, the second portion of the driver comprising data to access the host PCI device.

18. The method of claim 15, wherein the first host page table structure and the second host page table structure comprise a nested page table structure comprising a one-to-one mapping between a guest virtual memory address and a host physical memory address.

19. The method of claim 15, wherein the driver code associated with the driver is modified to cause the guest OS to execute the host page table switching instruction.

20. The method of claim 15, further comprising:
  determining whether the driver is an approved driver; and
  in response to determining that the driver is an approved driver, mapping the driver to the guest PCI alias address of the first host page table structure and the second host page table structure, wherein initiating the driver associated with the host PCI device is in response to mapping the driver to the guest PCI alias address.

* * * * *